United States Patent [19]
Beard

[11] Patent Number: 5,417,615
[45] Date of Patent: May 23, 1995

[54] AIR DRIVEN AMUSEMENT RIDE

[76] Inventor: Terry D. Beard, 1407 N. View Dr., Westlake Village, Calif. 91362-4031

[21] Appl. No.: 223,449

[22] Filed: Apr. 5, 1994

[51] Int. Cl.⁶ ............................................. A63G 31/10
[52] U.S. Cl. ...................................... 472/50; 472/131; 187/273
[58] Field of Search .................. 472/50, 49, 131, 134, 472/136, 137, 60, 59; 187/273, 407; 434/29, 59, 34, 247; 73/147

[56] References Cited

U.S. PATENT DOCUMENTS

| | | | |
|---|---|---|---|
| 2,221,215 | 11/1940 | Eyerly | 272/6 |
| 2,229,201 | 1/1941 | Williford | 272/6 |
| 2,927,661 | 3/1960 | Kristek et al. | 187/273 |
| 2,965,375 | 12/1960 | Hamilton | 272/7 |
| 3,087,386 | 4/1963 | Rung et al. | 89/1.7 |
| 3,484,953 | 12/1969 | Norheim, Jr. | 35/29 |
| 3,885,503 | 4/1974 | Barber | 104/76 |
| 4,487,410 | 12/1984 | Sassak | 434/55 |
| 4,973,042 | 11/1990 | Klopf et al. | 272/35 |
| 4,997,060 | 3/1991 | Sassak | 182/48 |
| 5,267,906 | 12/1993 | Kitchen et al. | 472/118 |

Primary Examiner—Carl D. Friedman
Assistant Examiner—Kien T. Nguyen
Attorney, Agent, or Firm—Koppel & Jacobs

[57] ABSTRACT

An air driven amusement ride propels a passenger vehicle upward along a guide cable out of an acceleration tube by a blast of pressurized air within the tube under the vehicle. Passengers experience a feeling of weightlessness and free fall from the time the vehicle exits the tube until it later re-enters, which can exceed ten seconds. The source of pressurized gas for the tube preferably includes a gas reservoir, a pump that raises the gas pressure in the reservoir at a predetermined pump rate, and a release that allows gas to flow from the reservoir into the tube at a rate substantially faster than the pump rate. Various mechanisms are disclosed to prevent the vehicle from over shooting the top of the ride and to limit the acceleration, including pressure relief valves in the acceleration tube, a pressure relief valve that extends through the vehicle itself, an emergency deceleration tube at the top of the guide cable with a pressure relief mechanism and emergency stops, and a system to adjust the acceleration pressure in accordance with the vehicle weight.

23 Claims, 3 Drawing Sheets

AIR DRIVEN AMUSEMENT RIDE

BACKGROUND OF THE INVENTION

1. Field of the Invention

This invention relates to amusement rides, and more particularly to amusement rides in which passengers are rapidly accelerated upward and then allowed to return to their initial position.

2. Description of the Prior Art

Many amusement park rides such as roller coasters thrill their riders by providing high speed and a varying acceleration. A thrill ride called Free-Fall by Six Flags of America amusement parks provides the rider with a 1 to 2 second experience of near weightlessness by elevating a passenger vehicle to a platform, moving the vehicle out along the platform and then allowing it to fall along a track that is initially vertical and then curves to a horizontal run. A free fall or weightless experience of longer duration can also be obtained with bungee jumping. However, bungee jumping has resulted in numerous accidents, and no amusement park ride has been devised that is capable of furnishing the same free fall thrill in a safe manner.

SUMMARY OF THE INVENTION

The present invention seeks to provide riders with a free fall weightless experience for a longer period of time than even bungee jumping, combined with the acceleration experience of blast off and re-entry in a rocket. This experience is provided with a ride that has a fail safe design, is economical and can be readily installed on existing structures both inside and outside amusement parks throughout the world.

Passengers are housed in a vehicle that travels along a guide cable secured at its upper end by an elevated support structure, such as an existing observation tower or a specially built structure. The vehicle begins the ride in a launch site acceleration tube. Pressurized gas is introduced into the acceleration tube below the vehicle at a pressure sufficient to launch the vehicle upward and out of the acceleration tube at a desired velocity along the guide cable. A pressure control mechanism limits the gas pressure applied to the vehicle so that it does not overshoot the cable. After rising to its maximum height, the vehicle is again guided by the cable back into the acceleration tube, which provides a pressurized cushion for decelerating and stopping it. The riders have a free fall, virtually weightless experience from the time the vehicle leaves the acceleration tube until it re-enters the tube; this can exceed ten seconds for a system approximately 170 meters in height.

The pressurized gas source for accelerating the vehicle preferably consists of a pressure reservoir, a pump that raises the gas pressure within the reservoir at a relatively slow rate, and a valve that releases gas from the reservoir into the acceleration tube at a substantially faster rate that produces an acceleration sufficient to propel the vehicle over at least the greater portion of the guide cable length.

Various pressure release mechanisms can be used, either singly or in combination, to make sure the vehicle is not over-accelerated. These include a gas conduit that extends through the vehicle around the cable, with a valve that responds to the vehicle acceleration exceeding a safe threshold level by opening to release pressurized gas from the under side of the vehicle out through the conduit. One or more pressure relief valves can also be provided in the wall of the acceleration tube to release gas from under the vehicle when the pressure within the tube exceeds a safe level. The loaded vehicle's weight can also be sensed prior to each launch, with a corresponding adjustment made to the flow of launch gas into the acceleration tube to maintain the same acceleration for different passenger loads. Pressure relief valves within the vehicle and/or the acceleration tube walls also limit the pressure buildup in the tube upon the vehicle's re-entry, and thereby cushion the vehicle deceleration to avoid abrupt stops.

Another optional safety feature is a deceleration tube at the upper end of the guide cable that receives the vehicle in case of overacceleration, and builds up a decelerating pressure to limit the vehicle's upward movement. The decelerating force of the upper tube is also limited by a pressure relief mechanism to avoid an overdeceleration. The pressure relief mechanism can be implemented in various ways, such as pressure relief valves in the deceleration tube wall, leaving a small gap between the vehicle's outer periphery and the tube's inner periphery and/or the same pressure relief valve through the vehicle used for limiting the accelerating pressure.

These and other features and advantages of the invention will be apparent to those skilled in the art from the following detailed description, taken together with the accompanying drawings.

DETAILED DESCRIPTION OF THE INVENTION

Figure 1:
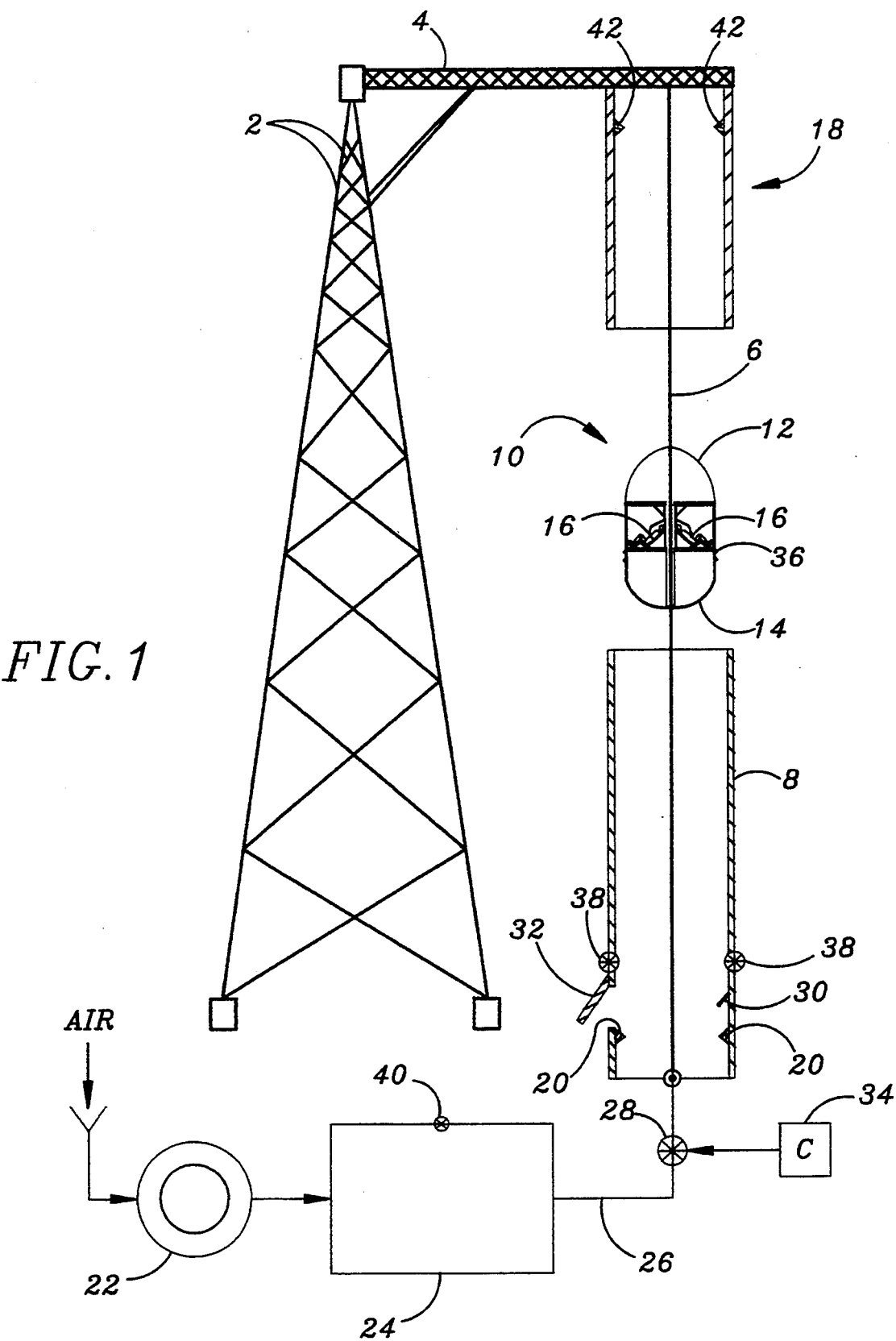
FIG. 1 is an elevation view of the amusement ride, with the accelerating gas system shown in block diagram format.

FIG. 1 shows an overall view of a preferred embodiment of the invention, in which the amusement ride is supported by a tower structure 2, which can be an existing observation tower or the like, or a specially constructed structure. A support arm 4 extends out laterally from the top of the tower, and at its outer end clamps the upper end of a guide cable 6 that extends down to the ground level. Although only one support arm for a single ride is shown, numerous support arms could extend out in different directions from the top of the tower, preferably symmetrically, with each arm supporting a separate cable for an additional ride. The rides add only a relatively small amount of structural loading to the tower, allowing existing structures to be retrofitted with the ride and thereby greatly reducing the overall construction cost.

An acceleration tube 8 with an open upper end is held in a vertical position extending up from ground level. The guide cable 6 extends along the acceleration tube's central axis, and is anchored at the lower end of the tube. A passenger vehicle 10 rides up and down along the cable, which runs through the vehicle and provides a guide for its vertical movement. The vehicle's upper side 12 and under side 14 are aerodynamically shaped to minimize air resistance. Passengers 16 sit on cushioned seats within the vehicle.

An emergency deceleration tube 18 with an open bottom end is preferably provided at the top of the cable, supported by the tower 2 and arm 4, to stop the vehicle in case it is travelling up too fast along the cable.

The vehicle normally rests on stops 20 that extend in from the periphery of the acceleration tube 8 towards its lower end. To launch the vehicle along the guide cable 6, a pressurized gas (preferably air) is rapidly introduced into the acceleration tube 8 below the vehicle. The gas pressure quickly builds up to a level sufficient to launch the vehicle out of the acceleration tube 8 towards the upper end of the cable. The passenger vehicle is accelerated along the length of the tube 8, and leaves the tube with a velocity sufficient to carry it up to a height slightly below the deceleration tube 18, at which point it commences a descent back into the deceleration tube 8. This gives the passengers a feeling of free fall or weightlessness for the entire interval between leaving and re-entering the acceleration tube. With reasonably sized support towers, this sensation can be made to last in excess of ten seconds.

Since an inordinately large gas pump would be required to rapidly pressurize the acceleration tube beneath the vehicle to a pressure sufficient to launch the vehicle to the desired height, a relatively small air pump 22 (typically 30–50 horsepower; 22–37 kw) is used to pump up the pressure in a large gas reservoir 24, which can be stored underground. The outlet from the gas reservoir is connected via a conduit 26 to the lower interior of the acceleration tube 8, with a valve 28 closing the conduit and preventing air flow from the reservoir 24 to the acceleration tube 8 between rides.

The vehicle 10 rests at the bottom of the acceleration tube on stops 20 as passengers are loaded and unloaded, and is held in that position by safety latches 30 that extend into corresponding detents in the vehicle but are withdrawn prior to launch. Once the passengers have completed loading through one or more entry ports 32 in the acceleration tube, the ports are closed and latched. The valve 28 is then opened by an operator control 34, allowing compressed air from the storage tank 24 to flow into the bottom of the acceleration tube below the vehicle. The buildup of air pressure drives the vehicle upward, accelerating it to terminal velocity as it exits the tube 8. The vehicle has a relatively snug fit within the acceleration tube, but rubber sealing skirts 36 are preferably added around its outer periphery, and also around a port in the under side of the vehicle for the guide cable, to enhance the air seal inside the tube and around the guide cable. The cable is preferably clad within the vehicle in a smooth sliding metal sheath to prevent air leaks, although a pressure relief mechanism described below leaves a clearance around the cable for the release of overpressurized air.

It is critical that the vehicle not overshoot the upper end of the guide cable. For this purpose several different safety measures are preferably used. One or more pressure relief valves 38 in the acceleration tube and additional pressure relief valves 40 in the pressure reservoir are set to assure that the system if not over-pressurized, and thereby over-accelerated. At the upper end of the guide cable 6, the emergency deceleration tube 18 assures a smooth pneumatic breaking in the event the vehicle somehow has been over accelerated. The pressure above the vehicle within the deceleration tube rapidly builds up as the vehicle penetrates further into the tube, bringing the vehicle to a stop and then allowing it to fall back to the launch site. The deceleration tube's circumference is somewhat greater than that of the vehicle, allowing some of the air above the vehicle to be squeezed out along the vehicle's sides. This prevents the pressure above the vehicle from building up too rapidly and bringing the vehicle an uncomfortably abrupt stop. Stops 42 extend inward into the deceleration tube near its upper end to provide a final vehicle stop in case all of the other safety mechanisms have somehow failed.

Once the vehicle 10 has reached the upper limit of its travel, it begins to fall back down along the guide cable 6. Upon its re-entry into the acceleration tube 8, the air pressure within the tube below the vehicle rapidly builds up as the vehicle travels further into the tube. The relief valves 38 are set to assure a smooth deceleration. If desired, the lower portion of the acceleration tube can also be vented back into the pressure reservoir 24 through a check valve (not shown) that allows a portion of the vehicle's kinetic energy to be recovered in the form of compressed air returned through the check valve to the air reservoir.

Figure 2:
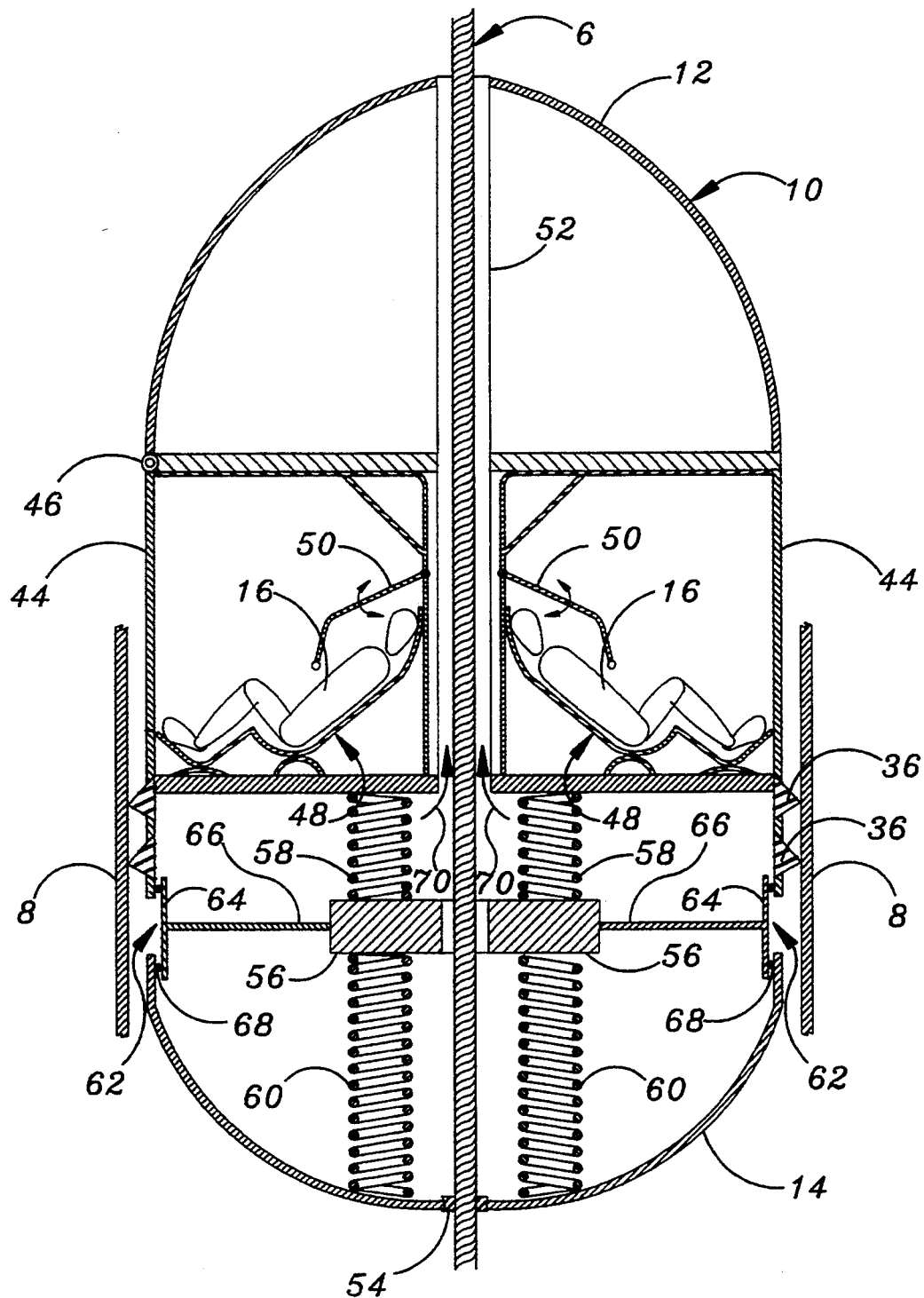
FIG. 2 is a sectional view of the passenger vehicle.

FIG. 2 shows further details of a preferred embodiment for the passenger vehicle 10. Passengers 16 enter through one or more doors 44 that open on pivots 46 in alignment with the acceleration tube entry ports 32, roll up into the vehicle, or otherwise open and close. The doors can be either opaque or transparent, as desired. There is also an option of leaving the passenger compartment open, although this can produce uncomfortable air flows and also increase the vehicle's aerodynamic drag. The passengers are seated on reclining padded seats 48 and held in place by restraining bars 50 that rotate down after the passengers are seated.

The guide cable 6 runs through the center of the vehicle within a guide tube 52, with an inward facing rubber ring 54 mounted along the under side of the vehicle in an opening where the cable leaves the vehicle to provide a small air bearing around the cable. The vehicle is constructed using conventional aircraft air frame manufacturing technology, with air gasket skirts 36 providing an air seal while the vehicle is in the acceleration tube.

A preferred form of pressure relief mechanism that can be used either by itself or in connection with the pressure relief techniques described above to limit the pressure under the vehicle, and thereby prevent over-accelerations, is housed within the vehicle itself. It operates by releasing air from below the vehicle through one or more channels in the vehicle when the acceleration exceeds a desired level. A weight 56, shown as a metal or rubber disk with a central opening for the guide cable 6, is suspended within the lower portion of the vehicle below the passenger compartment by springs 58 that run between the under side of the passenger compartment and the upper surface of the disk, and additional springs 60 between the under side of the disk and the vehicle's bottom wall. One or more openings 62 are provided through the vehicle's exterior wall along the under side of the vehicle, with corresponding valve disks 64 held at the ends of respective arms 66 that extend out from the disk 56 to normally close the openings 62. (The "under side" of the vehicle for this purpose includes all portions of the vehicle that receive the accelerating pressure, which in the embodiment shown is the full vehicle surface below the skirts 36.)

When the vehicle accelerates upward the disk 56 moves to a lower position, with the disk travel varying with the amount of acceleration. The valve disks 64 move down along with the disk 56; O-rings 68 or similar seals are preferably provided between the periphery of the openings 62 and the valve members 64 to permit movement of the valve members while maintaining the air seal.

The springs 58 and 60 are selected so that, in the event of an over-acceleration, the valve disks 64 will move downward sufficiently to uncover at least a portion of their respective openings 62. This allows over-pressurized air from the acceleration tube to flow into the vehicle and up the guide tube 52, as indicated by arrows 70. In this embodiment the guide tube 52 extends from the upper end of the vehicle only to the under side of the passenger compartment, where it opens to allow for an inflow of over pressurized air. The guide tube 52 thus also serves as a conduit for venting over-pressurized air to the upper side of the vehicle and out of the system. This establishes a limit to the acceleration that can be imparted to the vehicle.

The internal valve mechanism within the vehicle also functions upon re-entry back into the acceleration tube to prevent an over-pressure from developing below the vehicle that would cause it to stop too abruptly. A clearance is left inside the vehicle both below and above the valve disks 64, allowing them to move both down during launch and up during re-entry.

Instead of the spring-mounted weight 56, the vehicle could be provided with a conventional accelerometer that produces an electrical signal corresponding to the sensed acceleration, with an electro-mechanical control operating the vehicle valve in response to the accelerometer signal. However, this would require the vehicle to have an electrical power supply.

Figure 3:
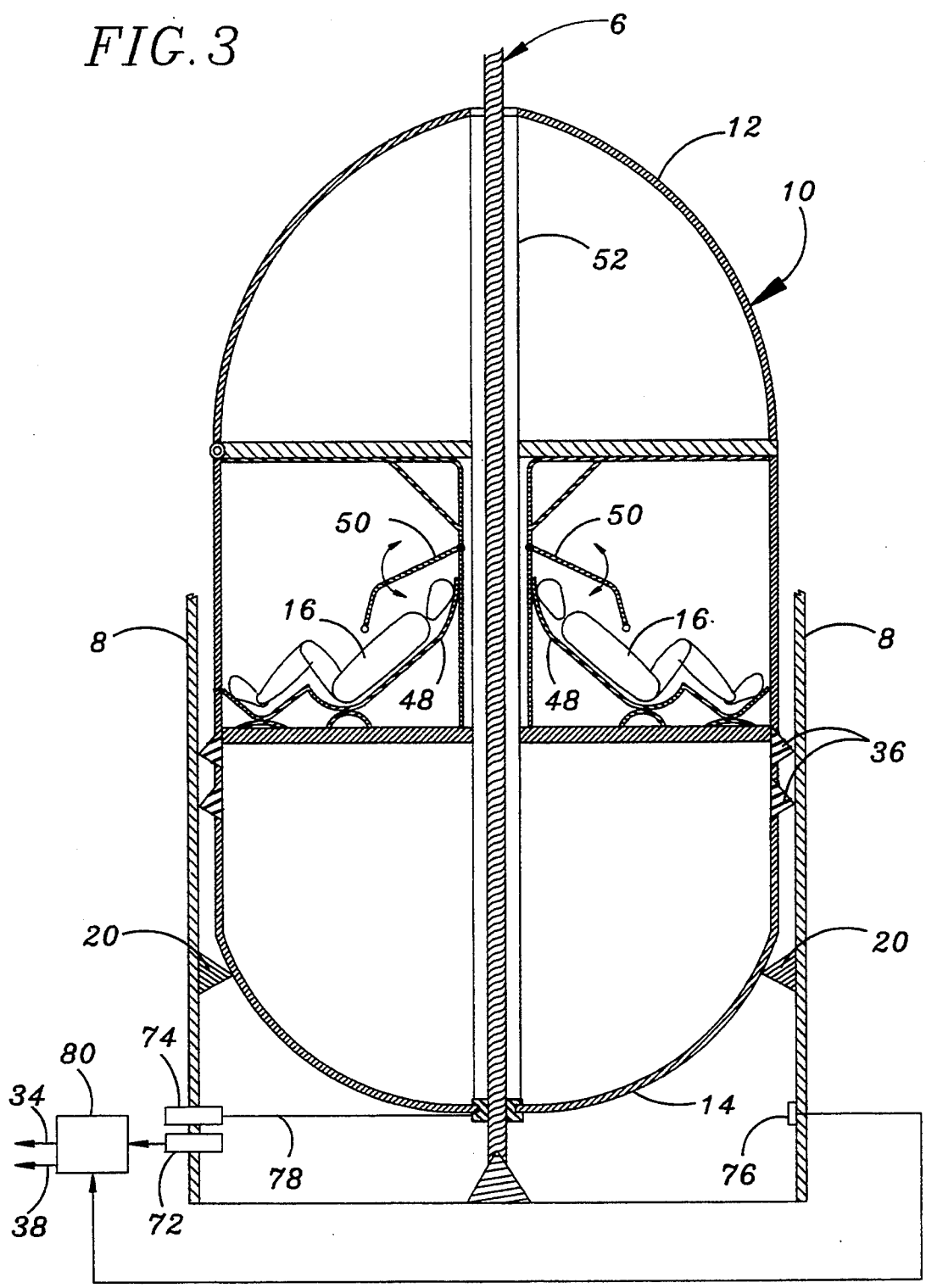
FIG. 3 is an elevation view illustrating a mechanism that respond to the vehicle weight to maintain a constant acceleration.

FIG. 3 is a sectional view of the passenger vehicle 10 in a pre-launch position within the acceleration tube 8, with another acceleration control mechanism that can be used in addition to the safety features described above. In this embodiment the internal guide tube 52 extends all the way down to the bottom of the vehicle, which is resting on the stops 20.

The vehicle's loaded weight with passengers on board will vary, depending upon the number and size of the passengers. If the acceleration pressure is maintained at a constant level despite differences in vehicle loads, the final acceleration reached at the vehicle's exit from the tube and the ultimate distance it travels will vary from ride to ride. The in-vehicle relief valve shown in FIG. 2 automatically compensates for this, since the valve is opened based upon an excessive acceleration, independent of the air pressure required to achieve that acceleration. Another compensation technique is illustrated in FIG. 3, in which the buildup of accelerating pressure under the vehicle is adjusted to increase the pressure for heavier loads and reduce the pressure for lighter loads. A system to accomplish this includes a pressure sensor 72 that senses the pressure within the acceleration tube below the vehicle. The tube pressure when the vehicle has just lifted off the stops 20 is a direct measure of the vehicle weight. An initial upward movement of the vehicle can be detected by means of a laser 74 and photodetector 76 on opposite sides of the acceleration tube just above the bottom of the vehicle, and slightly off-diameter to each other so that the laser beam is not obstructed by the guide cable 6. The laser beam 78 is blocked by the vehicle in its resting position, but continues on to the photodetector when the vehicle rises just above its stops.

In response to receiving the laser beam, the photodetector 76 sends a signal to actuate an adjustment control circuit 80. This circuit receives the output of pressure sensor 72, which indicates the vehicle weight at the moment the actuation signal from the photodetector is received. For high pressure levels, corresponding to a heavy passenger load, the control circuit sends signals to the air flow valve control 34 and to the pressure relief valves 38 to increase both the air flow rate into the acceleration tube and the over pressure threshold that must be reached before the relief valves 38 vent air from the acceleration tube. Conversely, a low detected pressure in the acceleration tube indicates a low vehicle weight, and control circuit 80 responds with control signals that reduce both the air flow rate into the tube and the threshold level for relief valves 38. This procedure assures proper vehicle acceleration, independent of the vehicle loading. Instead of the pressure sensor 72, laser 74 and photodetector 76, the vehicle stops 20 could be provided with a mechanism to directly weigh the vehicle and provide an appropriate signal to the control circuit 80. Arrangements could also be made for adding or withdrawing ballast such as water from the vehicle in response to the detected vehicle weight.

The following are design parameters for a preferred implementation of the ride. The acceleration tube is 3.66 meters (12 feet) in diameter, as is the vehicle including the air sealing skirts 36. The vehicle accommodates ten passengers in a reclined sitting position and weighs an average of about 1,100 kilograms (2,500 pounds) fully loaded. The vehicle is accelerated upwards in the acceleration tube at 49 meters/sec$^2$ (160 feet/sec$^2$ or 5 g) for 1.08 seconds, reaching a terminal velocity of 52.9 meters/sec (126 mph) as it exits the acceleration tube. The tube is 30 meters (approximately 100 feet) in height. The distance from the top of the tube to the top of the support tower 2 from the top of the tube to the top of the support tower 2 is an additional 153 meters (about 500 feet), giving an overall maximum ride height of 183 meters (600 feet). Upon exiting the acceleration tube the passengers will experience weightlessness for approximately 5.4 seconds going up, and for another 5.4 seconds coming down, for a total of almost 11 seconds.

To achieve the 5 g (49 meters/sec$^2$) acceleration plus a 1 g dead weight load, the total air pressure force on the bottom of the vehicle must equal 6,810 kg (15,000 pounds) on average. The effective cross-sectional area of the 3.66 meters (12 foot) vehicle is 10.5 meters$^2$ (16,286 square inches). An over pressure of approximately 2.9 kg/cm$^2$ (1 psi) on the bottom of the vehicle will thus provide the necessary acceleration. The total volume of the acceleration tube is 320 cubic meters (11,309 cubic feet). A pressurized air storage reservoir 6.1 meters (20 feet) long and 4.25 meter (14 feet) in diameter, pressurized to 14.6 kg/cm$^2$ (5 psi) provides the necessary propulsion; the reservoir volume is 86 cubic meters (2,827 cubic feet) and the conduit 26 can be about 0.75–0.94 meters (2.46–2.95 feet) in diameter. If the system were 100% efficient in storing energy in the form of pressurized gas and transferring all of the energy to the vehicle, a 24 kw (32 horsepower) motor driving the air pump 22 would be adequate for firing the ride once per minute. In practice the ride would normally cycle approximate every 90–120 seconds. A 37 kw (50 hp) motor driving a super charging-type compressor will supply the necessary compressed air.

In this example, upon launch the vehicle will rapidly accelerate to approximately 6 g's in about 0.1 seconds.

The 6 g acceleration will last for approximately one second, until the vehicle exits the acceleration tube with a velocity of approximate 203 meters per hour (126 mph). The vehicle will begin decelerating immediately at slightly more than the acceleration of gravity, due to wind resistive g load that decreases as the vehicle speed drops to a true 0 g at the top of the travel. The g force will then slightly increase as the vehicle's downward speed increases, due to aerodynamic drag. Finally, as the vehicle reenters the acceleration tube, the g load rapidly rises to 6 g's as the tube pressure reaches 2.9 $kg/cm^2$ (1 psi) over atmospheric. The pressure relief valves 38 operate to maintain the g load at the 6 g limit until the vehicle stops and is caught by rachet safety catches (the same pressure valves also limit the initial vehicle acceleration upon launch to 6 g). Any compressed air is bled from beneath the vehicle, which settles onto its resting stop mounts for unloading and reloading. Vehicle safety latches must be engaged before the passenger restraint bars 50 can be raised. The same pressure valves limit the initial vehicle acceleration upon launch to 6 g also.

While several embodiments of the invention have been shown and described, numerous variations and alternate embodiments will occur to those skilled in the art. Accordingly, it is intended that the invention be limited only in terms of the appended claims.

I claim:

1. An air driven amusement ride, comprising:
   an elevated support structure,
   a guide cable secured by said support structure and extending down to a launch site,
   a passenger vehicle guided by said guide cable for movement from and to said launch site,
   an acceleration tube at said launch site, said guide cable guiding said vehicle for movement out of and back into said acceleration tube,
   a pressurized gas source for introducing pressurized gas into said acceleration tube below said vehicle at a pressure sufficient to launch the vehicle upward along said guide cable and out of said tube, and
   a pressure control mechanism for limiting the gas pressure applied to the vehicle so that the vehicle does not overshoot said cable.

2. The amusement ride of claim 1, said pressurized gas source comprising a pressure reservoir, a pump connected to raise the gas pressure within said reservoir at a predetermined pump rate, and a release for releasing gas from the reservoir into said acceleration tube below said vehicle to increase the gas pressure in the tube at a rate substantially faster than said pump rate.

3. The amusement ride of claim 2, wherein said pressure reservoir is connected to said acceleration tube through a gas conduit, and said release comprises a valve that controls the flow of gas through said conduit.

4. The amusement ride of claim 1, said pressure control mechanism comprising at least one pressure relief valve in a wall of said tube for releasing gas from under the vehicle when the gas pressure within the tube exceeds a predetermined threshold.

5. The amusement ride of claim 1, said pressure control mechanism comprising a gas conduit through said vehicle from its under side to its upper side, and a valve that responds to a vehicle acceleration exceeding a predetermined threshold by opening to release gas from under the vehicle out through said conduit.

6. The amusement ride of claim 5, the underside of said vehicle having an exterior wall, said valve comprising an opening in said wall, a moveable member that normally closes said opening, and a spring-biased mass that is connected to displace said moveable member and expose said opening in response to the vehicle acceleration exceeding said predetermined threshold.

7. The amusement ride of claim 5, said vehicle including a guide tube with said cable running through and guided by said guide tube between the vehicle's upper and under sides, said guide tube providing said gas conduit for the release of gas from under the vehicle.

8. The amusement ride of claim 1, further comprising a weight sensor for sensing the vehicle's weight prior to launch, and a launch adjustment mechanism that adjusts the vehicle launch in response to the sensed vehicle weight to maintain substantially the same vehicle acceleration for different vehicle weights.

9. The amusement ride of claim 8, wherein said launch adjustment mechanism adjusts the flow of gas introduced into the acceleration tube for launching the vehicle.

10. The amusement ride of claim 1, said vehicle including a central guide tube with said cable running through said guide tube, and a passenger compartment around said guide tube.

11. The amusement ride of claim 1, further comprising a mechanical latch restraining said vehicle in the acceleration tube, and a latch control for resetting the latch to a non-restraining position for a launch.

12. The amusement ride of claim 1, further comprising a deceleration tube at the upper end of the guide cable with an open lower end for receiving said vehicle, said deceleration tube decelerating the vehicle to terminate its upward motion.

13. The amusement ride of claim 12, said deceleration tube having an inner periphery that exceeds the vehicle's outer periphery by an amount small enough to leave enough air above the vehicle to fully decelerate it, but large enough to allow an escape of air from above the vehicle around the vehicle's periphery to cushion said deceleration.

14. The amusement ride of claim 12, said deceleration tube including a wall with at least one pressure relief valve for releasing air from the deceleration tube above an entering vehicle when the air pressure within said tube exceeds a predetermined threshold, said threshold being low enough to leave enough air within the tube above the vehicle to fully decelerate it, but large enough to allow an escape to air from above the vehicle to cushion said deceleration.

15. The amusement ride of claim 1, wherein said support structure secures said guide cable substantially vertically.

16. An air driven amusement ride, comprising:
   an elevated support structure,
   a guide cable secured by said support structure and extending down to a launch site,
   an acceleration/deceleration tube at said launch site,
   a passenger vehicle guided by said guide cable for movement out of and back into said tube,
   a pressurized gas source for introducing pressurized gas with said tube below said vehicle at a sufficient pressure to launch the vehicle upward along said guide cable and out of said tube, and
   a pressure relief valve limiting the launch pressure within said tube so that the vehicle does not overshoot said cable, and limiting the gas pressure within said tube upon re-entry of the vehicle into the tube so that the vehicle is gradually decelerated over the major portion of said tube.

17. The amusement ride of claim 16, said pressurized gas source comprising a pressure reservoir, a pump connected to raise the gas pressure within said reservoir at a predetermined pump rate, and a release for releasing gas from the reservoir into said acceleration/deceleration tube below said vehicle to increase the gas pressure in the tube at a rate substantially faster than said pump rate.

18. The amusement ride of claim 16, said pressure control mechanism comprising at least one pressure relief valve in a wall of said tube for releasing gas from under the vehicle when the gas pressure within the tube exceeds a predetermined threshold.

19. The amusement ride of claim 16, said pressure relief valve comprising a gas conduit through said vehicle from its under side to its upper side, and a valve structure that responds to a vehicle acceleration or deceleration exceeding a predetermined threshold by opening to release gas from under the vehicle out through said conduit.

20. The amusement ride of claim 19, the underside of said vehicle having an exterior wall, said valve structure comprising an opening in said wall, a moveable member that normally closes said opening, and a spring-biased mass that is connected to displace said moveable member and expose said opening in response to the vehicle acceleration or deceleration exceeding said predetermined threshold.

21. The amusement ride of claim 19, said vehicle including a guide tube with said cable running through and guided by said guide tube between the vehicle's upper and under sides, said guide tube providing said gas conduit for the release of gas from under the vehicle.

22. The amusement ride of claim 16, said vehicle including a central guide tube with said cable running through said guide tube, and a passenger compartment around said guide tube.

23. The amusement ride of claim 16, wherein said support structure secures said guide cable substantially vertically.

* * * * *